United States Patent [19]

Watson

[11] 4,391,269

[45] Jul. 5, 1983

[54] CONTROLLED SOLAR HEATING AND HEAT RETENTION OF LIQUID

[76] Inventor: W. Keith R. Watson, P.O. Box 1537, Rancho Santa Fe, Calif. 92067

[21] Appl. No.: 305,970

[22] Filed: Sep. 28, 1981

[51] Int. Cl.$^3$ ............................. F24J 3/02; G02B 5/08
[52] U.S. Cl. ................................. 126/437; 126/438; 350/306
[58] Field of Search .............. 126/438, 439, DIG. 1, 126/426, 419, 450, 437; 350/306

[56] References Cited

U.S. PATENT DOCUMENTS

| | | | |
|---|---|---|---|
| 3,872,854 | 3/1975 | Raser | 126/438 |
| 4,280,480 | 7/1981 | Raposo | 126/436 |
| 4,306,544 | 12/1981 | Clemens | 126/438 |

Primary Examiner—James C. Yeung
Assistant Examiner—G. Anderson
Attorney, Agent, or Firm—William W. Haefliger

[57] ABSTRACT

Solar heating apparatus comprises
(a) a generally horizontally elongated tank to contain liquid,
(b) a generally longitudinally extending horizontally elongated container extending about the tank, the container defining glazing facing one side of the tank and a top portion of the tank, adapted to receive impingement of solar radiation, the glazing spaced from the tank,
(c) and a solar radiation auxiliary reflecting panel projecting generally away from a region below the level of the lower extent of the tank and exteriorly of the container to reflect solar radiation toward and through the glazing for impingement on the tank.

11 Claims, 8 Drawing Figures

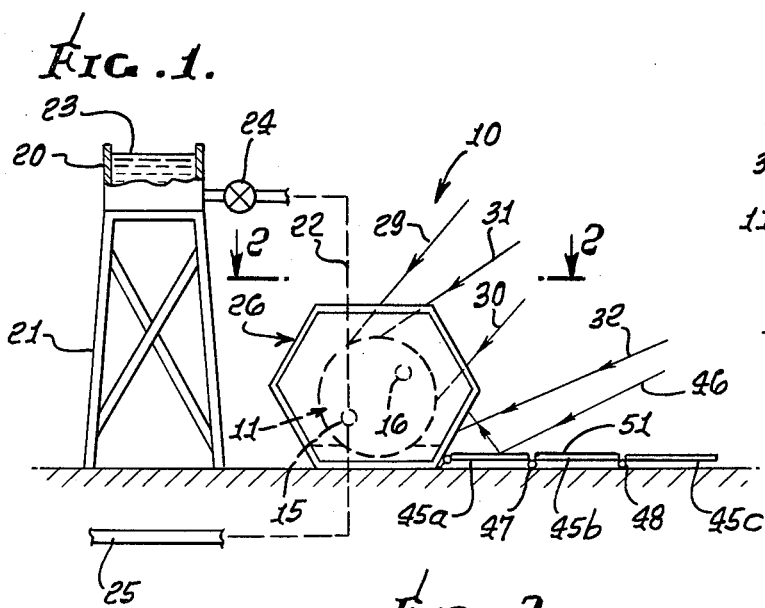
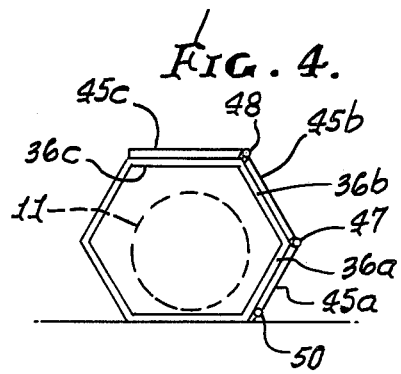
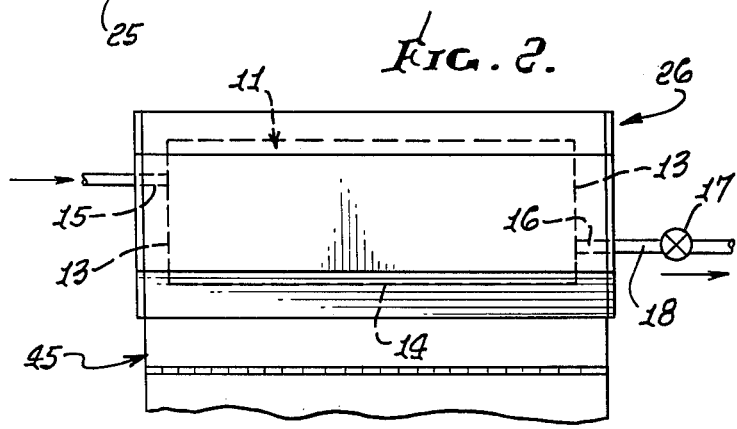
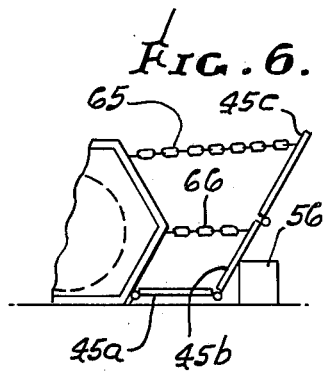
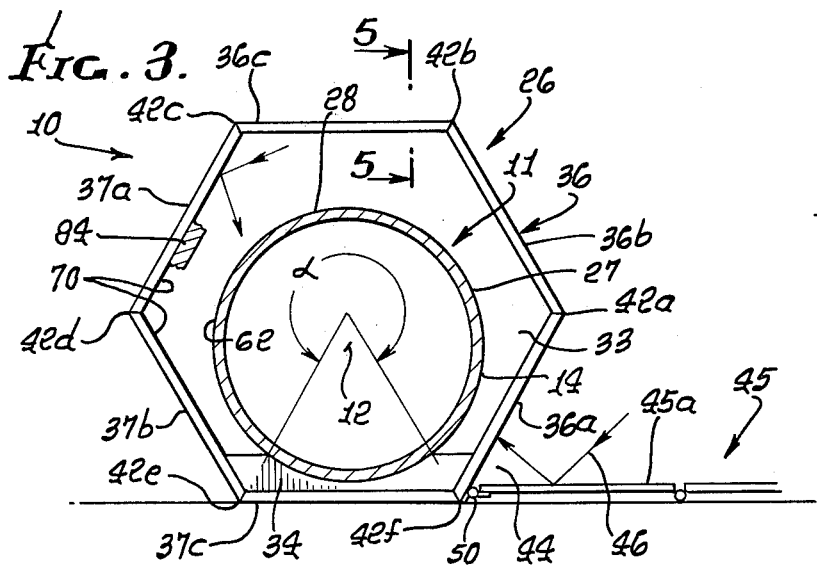
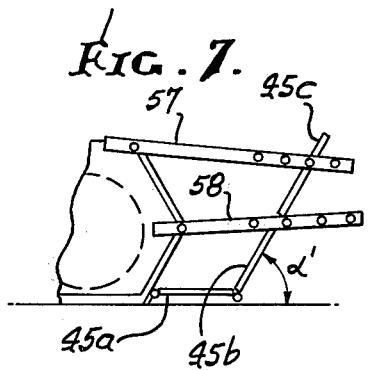
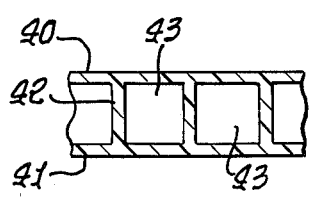
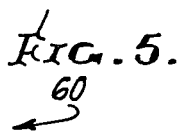
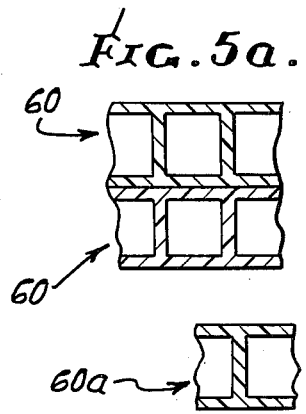

CONTROLLED SOLAR HEATING AND HEAT RETENTION OF LIQUID

BACKGROUND OF THE INVENTION

This invention relates generally to solar heating apparatus; and more particularly concerns a solar heater of low cost and simple construction, high efficiency, and providing a pressurized source of liquid (such as water) flow.

There is need in certain remote areas, as well as poverty stricken areas of the world for liquid (as for example water) heaters that are of extremely low-cost and simple construction, and which will provide pressurized flow of such heated liquid. Prior designs of which I am aware do not meet these objectives to provide the unusually advantageous combinations of features and modes of operation as are found in the device of the present invention.

SUMMARY OF THE INVENTION

It is a major object of the invention to provide apparatus meeting the above needs. Basically, the apparatus comprises:

(a) a generally horizontally elongated tank to contain liquid, (b) a generally longitudinally extending horizontally elongated container extending about said tank, the container defining glazing facing one side of the tank and a top portion of the tank adapted to receive impingement of solar radiation, the glazing spaced from the tank, and (c) a solar radiation auxiliary reflecting panel projecting generally away from a region below the level of the lower extent of the tank and exteriorly of the container to reflect solar radiation toward and through said glazing for impingement on the tank.

As will appear, the container glazing may define flat planar sections extending at angles relative to one another; the container may include other panel sections carrying reflective surfaces to reflect solar radiation in the container interior toward the back side of the tank; the exterior reflecting panel may be flexible, as by means of hinging of panel sections, to fold upwardly and about the glazing sections of the container to block heat loss; the glazing may consist of multiple spaced walls, as will appear; and an external reservoir for liquid may be used to provide constant pressurization of the tank liquid.

These and other objects and advantages of the invention, as well as the details of an illustrative embodiment, will be more fully understood from the following specification and drawings, in which:

DRAWING DESCRIPTION

FIG. 1 is an end elevation of apparatus incorporating the invention;

FIG. 2 is a plan view on lines 2—2 of FIG. 1;

FIG. 3 is an end view taken in sections through the solar heater of FIGS. 1 and 2;

FIG. 4 is an end view of the solar collection, in protected condition; and

FIG. 5 is a section taken on lines 5—5 of FIG. 3;

FIG. 5a is a view similar to FIG. 5; and

FIGS. 6 and 7 are views like FIG. 1.

DETAILED DESCRIPTION

In the drawings, the solar heater apparatus 10 includes a generally longitudinally horizontally elongated tank 11 to contain liquid, as for example water. The tank may be metallic, and circular in cross section, with a horizontal axis 12. It is shown to have end walls 13, and a circular side wall 14, with a lower fill port 15 and a higher discharge port 16 in the opposite end walls. A valve 17 in the discharge line 18 controls warm or hot liquid discharge, as required. The steel wall of the tank may be treated with a black selective coating compound such as Thermalox manufactured by Dampney Company of Everett, Mass. The compound allows high absorptivity of solar waves, and low emissivity of longer infra-red waves as at night, for heat loss suppression.

Liquid in the tank is typically pressurized and the tank kept full, so that warm liquid will always flow from the higher exit port 16. One such liquid pressurization means is shown in FIG. 1 to comprise a fill reservoir 20 supported by structure 21 at a higher level than tank 11, a line 22 conducting liquid 23 from tank 20 to tank 11 via control valve 24 and fill port 15. Liquid may be periodically poured into reservoir 20, whereby liquid in tank 11 is always pressurized, so that in remote regions warm liquid (such as water) under pressurization, is always available. A pressurized source, indicated by line 25, may alternatively be used.

A generally longitudinally extending, horizontally elongated container; such as is indicated at 26, is employed to extend about the tank 11, the container defining glazing 36 facing one side 27 of the tank, and a top portion 28 of the tank and being spaced from the tank. The glazing is adapted to receive impingement of solar radiation and to pass such radiation for direct impingement on the tank. See in this regard, solar rays 29 and 30 impinging during the summer, and rays 31 and 32 impinging during the winter. Air in space 33 between the tank and container is also heated and serves as an insulative barrier to block heat conduction from the tank. The latter is supported at 34, as via wooden blocks or other means, so that barrier space 33 extends through an angle α sub-tending over 180°, about the tank.

The container typically comprises flat planar or panel sections including glazing sections 36a, 36b, 36c, (the container ends are also typically glazed) and insulative panel sections 37a, 37b and 37c, the latter sections for example consisting of wood or synthetic resin (plastic) material. Urethane or isocyanurate foams are examples. Bottom section 37c may consist of wood or metal. Sections 37a, 37b and 37c are coated with or carry mirror-like reflecting material 70, such as aluminum foil or metallized plastic, to reflect solar rays to the back side of the tank as at 62, and infra-red waves back to the tank bottom. These panel sections may be of generally the same size, to form a polygon such as a hexagon for example. The glazing sections may advantageously consist of TWIN WALL TUFFAK 60, distributed by Rohm and Hass. See FIG. 5 showing parallel walls 40 and 41, integrally interconnected by ribs 42, with trapped air spaces appearing at 43. This affords a very efficient additional means to block heat conduction and free convection in an outward direction. FIG. 5a shows two (joined) thicknesses 60 of the FIG. 5 glazing, for added prevention of heat loss as in especially cold climates. A third and single glazing 60a may be spaced inwardly of the glazings 60, as in FIG. 5a. The panels are suitably interconnected and bent or sealed along longitudinal junctions 42a–42f, to provide rigidity. Panels 60 may be spaced apart, the spacing providing insulation.

Also provided is an auxiliary solar radiation collecting and reflecting panel projecting generally horizontally from the container, from a region 44 below the level of the lower extent of the tank, to collect and reflect additional solar radiation toward and through the glazing, for impingement on the tank, to enhance heating of liquid therein. See for example panel 45 reflecting solar radiation beam or ray 46 toward and through panels 36a, during winter months. The panel 45 may typically include multiple flat and insulated reflective panel sections 45a, 45b and 45c, which may be hinge connected at 47 and 48 to accommodate panel extension (see FIGS. 1 and 3) and panel collapse (see FIG. 4). In extended condition the panel sections fully reflect solar radiation toward the container or tank, as during the day. This lessens or eliminates the need for swinging of the container and tank to "follow" the sun as it relatively crosses the sky during the day. At night, the panels may be collapsed as in FIG. 4, to enclose or cover the rectangular glazing sections 36a, 36b and 36c, to provide maximum protection against loss of heat from the tank liquid, by radiation and conduction. Thus, the panel sections 45a, 45b and 45c co-operate, by hinging at 50, 47 and 48 to conform to the semi-hexagonal shape of glazing sections 36a, 36b and 36c, as shown. Collapsing and extension of the panel sections may be carried out manually, or by an actuator. For less extreme climate conditions, sections 45a may be rigidly connected at 50 to the container 36, and panel sections 45b and 45c moved in accordance with the season.

The panels may consist of wood, or plastic or other highly insulative material, with highly reflective mirror surfaces applied thereto, as at 51. Typical of such surfaces are aluminum foil, or metallized plastic sheet.

FIG. 6 shows panels 45a and 45b, (as in FIGS. 1 and 3), with panel 45b made angularly adjustable (as by adjustable block 56) to control heating of the tank. See also support chains 65 and 66. In FIG. 7 adjustable bars 57 and 58 connected with the panels as shown control the panel angularity, for seasonal changes.

In FIG. 3, insulation may be employed between the tank and panels 37a and 37b, and also beneath the tank. See for example insulation indicated at 84. The container bottom may be white surfaced, to inhibit downward radiation loss.

From the foregoing, it is clear that the invention provides:

(a) a very low cost solar heater of simple construction, suitable for installation and use in remote areas and in poverty striken countries of the world, to provide hot water, for sanitary and other purposes;

(b) a liquid heater of efficient operation and use, characterized by minimum heat loss, and maximum heat gain, (c) a solar heater that need not be rotated or shipped to follow the sun's path for efficient operation, (d) A source of pressurized hot water, using gravitation and solar energy, (e) controlled heating is achieved by simple auxiliary panel angular adjustment.

I claim:

1. In solar heating apparatus:
   (a) a generally horizontally elongated tank to contain liquid, the tank being solar radiation absorbing,
   (b) a generally longitudinally extending horizontally elongated container extending about said tank, the container defining glazing facing one side of the tank and top portion of the tank, adapted to received impingement of solar radiation, the glazing spaced from the tank, and being insulative,
   (c) and solar radiation auxiliary reflecting panels including at least one panel projecting generally away from a region below the level of the lower extent of the tank and exteriorly of the container to reflect solar radiation toward and through said glazing for impingement on the tank, said panels being hinge supported and having alternate positions in which they have been swung to extend adjacent the glazing facing the side and top portion of the tank to block heat loss from the tank at night,
   (d) the container being polygonal in lateral upright planes, and having planar generally rectangular sections of said glazing, the panels sized in correspondence to said glazing sections to which they extend respectively adjacent, in said alternate positions.

2. The apparatus of claim 1 wherein said panel includes at least two sections which are hingedly interconnected, and insulative.

3. The apparatus of claim 1 wherein the glazing sections define planes which intersect along an axis which extends longitudinally.

4. The apparatus of claim 1 wherein the glazing comprises at least two parallel overlying transparent synthetic resinous sheets which are rigidly interconnected.

5. The apparatus of claim 1 including a radiation reflecting surface facing the opposite side of the tank and spaced therefrom, and insulation between said surface and the container, there also being insulation beneath the tank.

6. The apparatus of claim 5 wherein said radiation reflecting surface is inside the container.

7. The apparatus of claim 1 including a liquid supply source connected with said tank.

8. The apparatus of claim 7 wherein said source comprises a liquid supply reservoir at a higher elevation than said tank.

9. The apparatus of claim 3 wherein the container includes sections carrying solar ray reflecting surfaces located to reflect solar rays in the container back toward the opposite side of the tank.

10. The apparatus of claim 2 including adjustable holder means to adjustably hold one or more of the hinged panels at selected angularity relative to the container.

11. The apparatus of claim 1 including a selective black coating on the tank.

* * * * *